United States Patent
Ogura

[11] Patent Number: 6,142,920
[45] Date of Patent: Nov. 7, 2000

[54] TOOL GRIPPER FOR TOOL RACK TYPE MAGAZINE

[75] Inventor: Masato Ogura, Katsuta-gun, Japan

[73] Assignee: Mori Machinery Corporation, Okayama, Japan

[21] Appl. No.: 09/217,945

[22] Filed: Dec. 21, 1998

[30] Foreign Application Priority Data

Feb. 10, 1998 [JP] Japan .................................. 10-028681

[51] Int. Cl.[7] .................................................. B23Q 3/157
[52] U.S. Cl. ............................ 483/59; 211/70.6; 483/58; 483/65
[58] Field of Search .................................. 483/58, 59, 60, 483/65, 61, 67, 66; 211/70.6, 69

[56] References Cited

U.S. PATENT DOCUMENTS

| | | | |
|---|---|---|---|
| 4,274,192 | 6/1981 | Norimatsu | ................................. 483/58 |
| 5,107,581 | 4/1992 | Reuter et al. | ............................. 211/1.5 |

FOREIGN PATENT DOCUMENTS

| | | | |
|---|---|---|---|
| 81/00352 | 2/1981 | European Pat. Off. | ................. 483/58 |
| 522498 | 1/1993 | European Pat. Off. | ................. 483/58 |
| 3843519 | 7/1990 | Germany | ................................. 483/59 |
| 11-99431 | 4/1999 | Japan | ...................................... 483/58 |
| 1583247 | 8/1990 | U.S.S.R. | ................................. 483/59 |

*Primary Examiner*—William Briggs
*Attorney, Agent, or Firm*—Koda & Androlia

[57] ABSTRACT

A tool gripper which holds a plurality of tools in arm portions thereof. The gripper is provided in a tool rack type magazine that accommodates tools used in machine tools, and each of the arm portions of the tool gripper is arc-shaped and opened in an obliquely upward direction so that a tool entrance of the arm portion faces obliquely upward over a tool holding portion of the arm portion. The tool gripper is obtained by processing a continuous, elongated plate with laser or press to form the arm portions, and such a plate can be obtained by overlaying a plurality of thin plates in the thickness direction into a sandwich structure.

3 Claims, 7 Drawing Sheets

TOOL GRIPPER FOR TOOL RACK TYPE MAGAZINE

BACKGROUND OF THE INVENTION

1. Field of the Invention

The present invention relates to an improvement in a tool gripper for use in a tool rack type magazine for feeding a number of various kinds of tools into an automatic tool exchanger of a machine tool.

2. Description of Related Art

In machine tools, tools for intended machining works are fed by an automatic tool exchanger, and, for instance, a tool rack type magazine that stores tools is employed in such an automatic tool exchanger. In this tool rack type magazine, the tools are held by arm portions of tool grippers which are arranged in vertical and horizontal directions so that a tool that has been used in the machine tool is exchanged by another tool stored in the magazine by moving a tool carrying device in the vertical and horizontal directions. Generally, a tool exchanger is designed so as to allow the tools to be taken in and out in horizontally lateral directions; accordingly, in the prior art, so as to prevent the tools from falling off, ball plungers are disposed in the vicinity of tool entrances of the arm portions of the tool grippers. Turn-preventive keys are also used for the same purposes. The tool grippers of the prior art as described above are obtained by a plurality of gripper unit plates. The gripper unit plates each having arm portions on its right and left sides are sequentially fixed on a column so as to be arranged in the vertical direction.

In the above-described prior art gripper, each of the gripper unit plates is machine-worked so as to form the arm portions on both sides, and then such plates are mounted on a column. Since such a tool rack type magazine is used in order to store a great number of tools, the number of the parts used tends to be large; as a result, it requires a great number of working and assembling steps. Accordingly, the manufacturing costs also tend to be high.

SUMMARY OF THE INVENTION

Accordingly, the first object of the present invention is to improve the structure of a tool gripper in which tools are assuredly prevented from falling, and in which the manufacturing cost is lowered by using less parts by eliminating fall preventive means such as ball plungers, leaf springs or the like.

The second object of the present invention is to provide a method of manufacturing a tool gripper in which the arm portions of the gripper are obtained not by processing a gripper unit plate that includes a pair of right and left arm portions but by laser cutting or press cutting on an ordinary steel plate.

The third object of the present invention is to provide a tool rack type magazine of any desired size (large or small) by forming tool grippers that include additional values obtained by combining the first and second objects described above.

More specifically, the present invention provides a tool gripper for holding tools (or a tool gripper that holds tools by tool holder portions of the tools) individually in a plurality of arm portions of a magazine that accommodates a number of tools for an automatic tool exchanger, wherein the tool gripper has at least one arm portion which is arc-shaped and opened in an obliquely upward direction so that a tool entrance is located over a tool holding portion.

The tool grippers of the present invention include a pair of arm portions that are opened on both sides of a vertically continuous plate member.

In the above, the arm portions can be formed in a plate member so that they are opened horizontally or opened in an obliquely upward direction so that the tool entrances of the arm portions are positioned over the tool holding portions of the arm portions. With the structure in which the arm portions are opened horizontally in plate members as seen in prior art, a fall-preventive means is used at the tool entrances of the arm portions so as to prevent the tools from falling off. On the other hand, with the structure in which the arm portions are opened obliquely upward so that the tool entrances are positioned over the tool holding portions at obliquely upward positions as in the present invention, such tool fall-preventive means can be eliminated.

Moreover, in the present invention, the vertically continuous elongated plate member (on which the arm portions are provided) may be obtained by overlaying a plurality of thin plates in the thickness direction. In this structure, one of the thin plates has a ridge portion, which contacts a V-groove of the tool holder portion of a tool, or a tool turn-preventive key. For example, the plate member can be composed of three thin plates, and the arc-shaped arm portion of the thin plate located in the middle is formed with a smaller radius than the arm portions of the other two thin plates so that the arc-shaped edge of the thin plate in the middle can serve as the ridge portion that engages the V-groove of the tool holder portion of a tool.

For the above-described plate members, it is advantageous to use a vertically continuous elongated plate that extends along the tool magazine. However, such an elongated plate can be cut into short pieces without departing the object of the present invention.

DETAILED DESCRIPTION OF THE PREFERRED EMBODIMENTS

Embodiments of the invention will be described with reference to the accompanying drawings.

Figure 1:
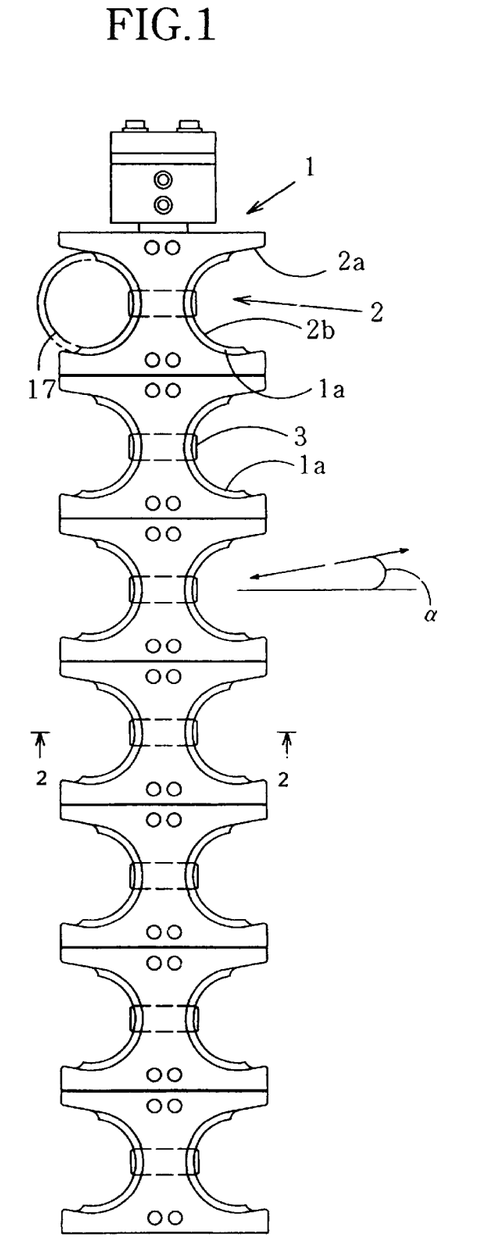
FIG. 1 is a front elevational view of a tool gripper according to a first embodiment of the present invention.
Figure 2:
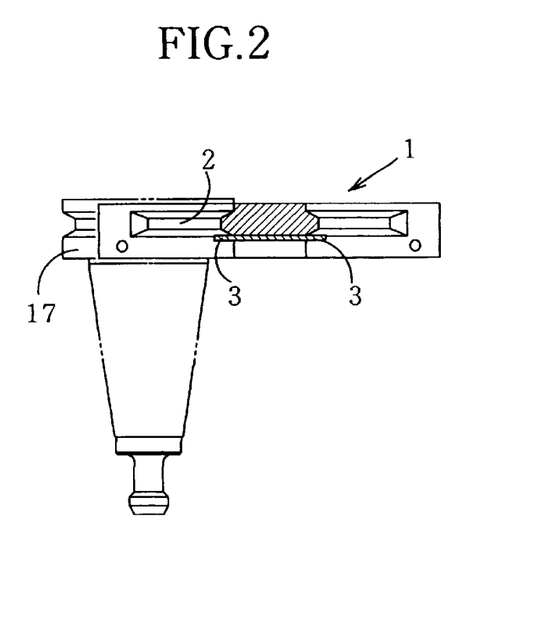
FIG. 2 is a cross-sectional view taken along the line 2—2 in FIG. 1.

FIGS. 1 and 2 show a tool gripper according to the first embodiment of the present invention.

Figure 11:
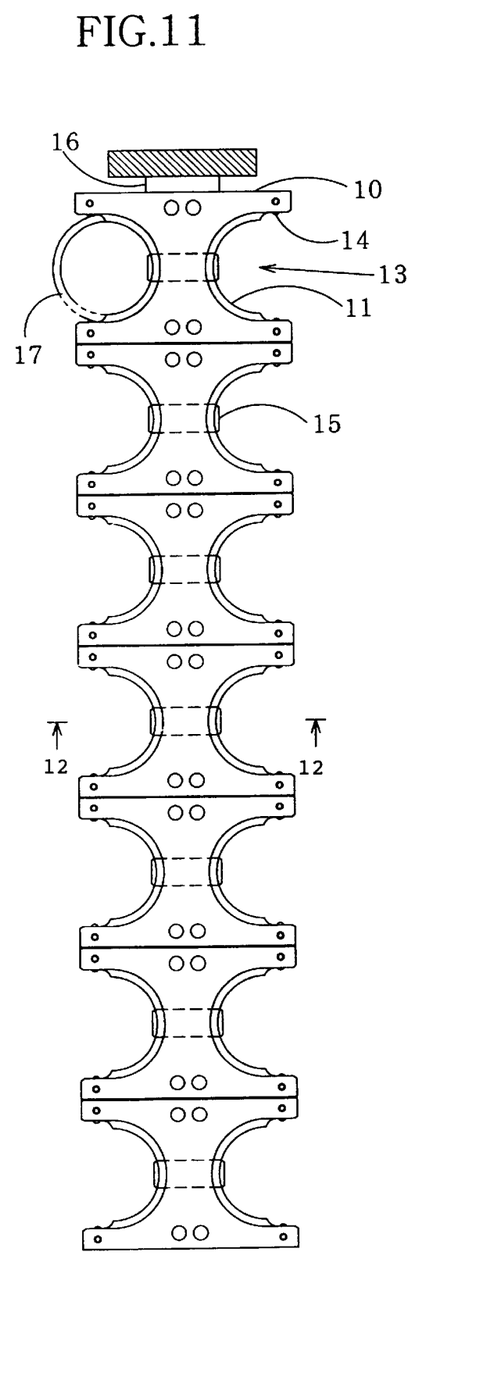
FIG. 11 is a front elevational view of a tool gripper of the prior art.
Figure 12:
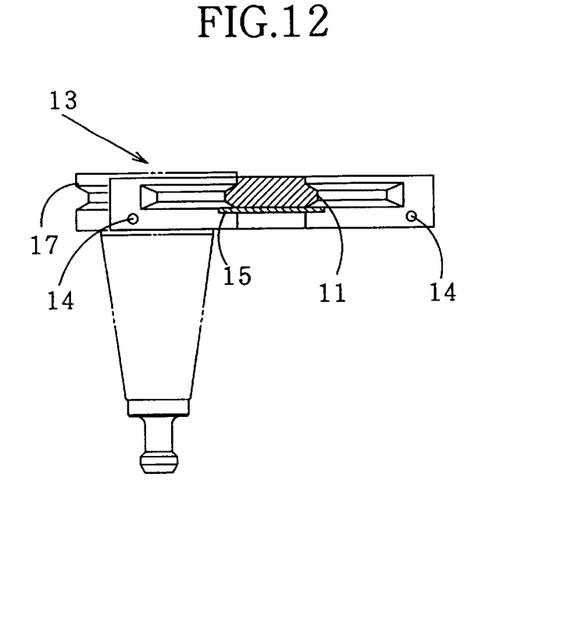
FIG. 12 is a cross-sectional view taken along the line 12—12 in FIG. 11.

Compared to the prior art shown in FIGS. 11 and 12, the tool gripper 1 of the present invention has improved arm portions 2. In other words, unlike the tool gripper 10 of the prior art that has an arc-shaped arm portion 13 opened vertically symmetric in a horizontal direction, each of the arm portions 2 of the present invention is, as seen from FIGS. 1 and 2, arc-shaped and opened obliquely upward so that a tool entrance 2a is positioned over a tool holding portion 2b and obliquely upward location. Like the prior art gripper 10 that has a V-groove contact ridge portion 11, the gripper 1 of the present invention has a V-groove contact ridge portion 1a that is a curved ridge engaging the V-groove of a tool holder portion of a tool.

Because of the arm portion 2 that is opened in the obliquely upward direction, the tool stored therein is taken out obliquely upward. In the shown embodiment, the angle for taking out the tool is at an inclination angle α of 10 degrees. In other words, the arm portion is opened obliquely upward at an inclined angle of 10 degrees. This inclination angle α is preferred to be in the range of 5 to 20 degrees. Like the tool holding portion of the prior art that has a tool turn-preventive key 15, the tool holding portion 2b of the tool gripper of the present invention may have a tool turn-preventive key 3.

With the structure above in which the arm portion 2 is opened obliquely upward, a tool can be held by its own weight on the tool holding portion 2b. As a result, the fall-preventive means such as a ball plunger 14 as shown in FIG. 11 and a leaf spring or the like which are employed in the prior art are not required in the present invention.

Figure 3:
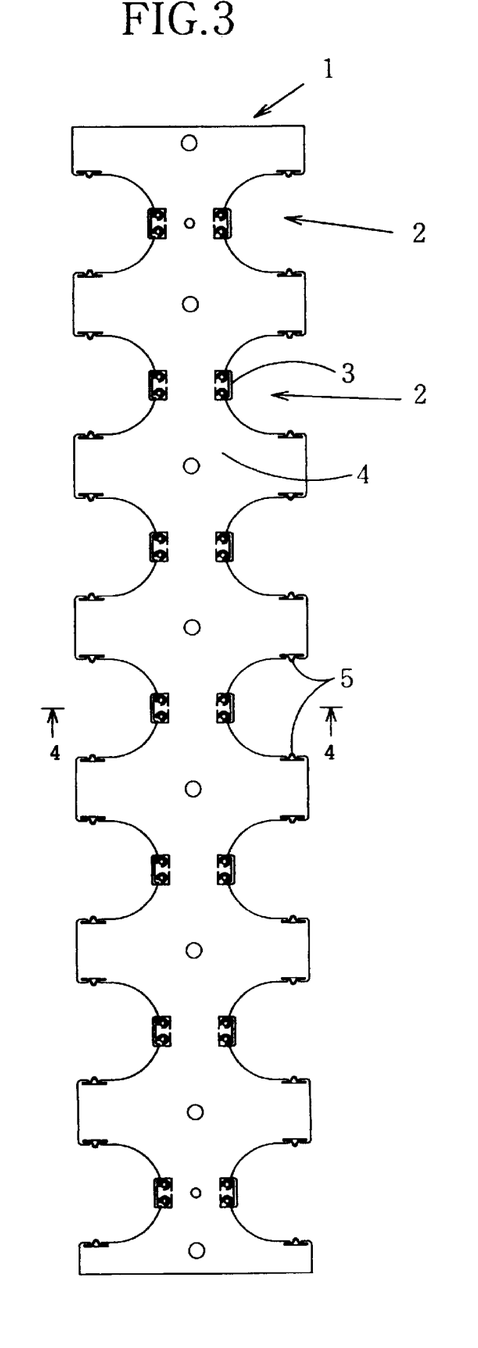
FIG. 3 is a front elevational view of a tool gripper according to a second embodiment of the invention.
Figure 4:
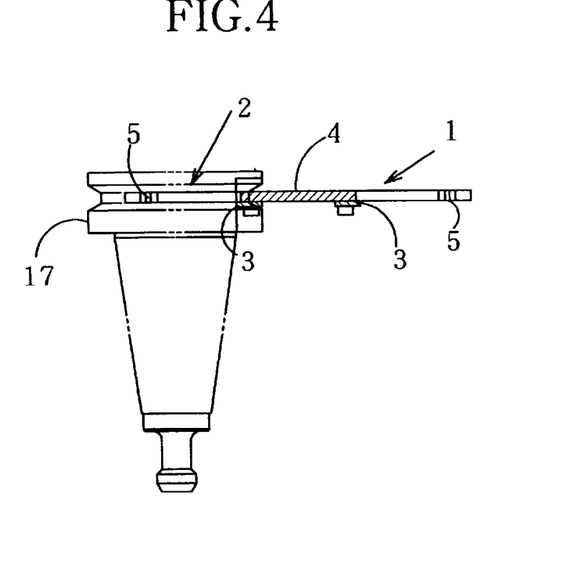
FIG. 4 is a cross-sectional view taken along the line 4—4 in FIG. 3.

FIGS. 3 and 4 show a tool gripper according to the second embodiment of the present invention. This embodiment is an improvement over the structure of the prior art wherein a number of plates each having the right and left arm portions 13 are vertically arranged and fixed on a column 16.

More specifically, in this second embodiment, not a plurality of gripper unit plates each having the arm portions on both sides thereof are fixed on a column as in the prior art, but a plurality of arm portions 2 are formed in a vertically continuous elongated plate 4 so as to extend leftward and rightward. In this second embodiment, the elongated plate 4 is obtained by cutting a single plate with a laser working machine. This structure that includes a vertically continuous elongated plate with a plurality of arm portions 2 extending sideways is advantageous in that the tool gripper can be manufactured more efficiently than in the prior art in which a plurality of gripper unit plates are assembled. In the embodiment shown in FIGS. 3 and 4, leaf springs 5 are mounted in upper and lower portions of the opening of each arm portion 2 so as to prevent the tool from falling. The tool turn-preventive keys 3 is employed in this embodiment as in the first embodiment, but the tool turn-preventive keys 3 of this embodiment are of a simple structure in which short metal pieces are screwed. Thus, in this second embodiment, the curved inner surface of each arm portion 2 has a single flat surface and no V-groove contact ridge portion is formed thereon. The holding arm is not subjected to a cutting work for forming the ridge portions, and the tool gripper of this embodiment can be composed of inexpensive parts.

Figure 5:
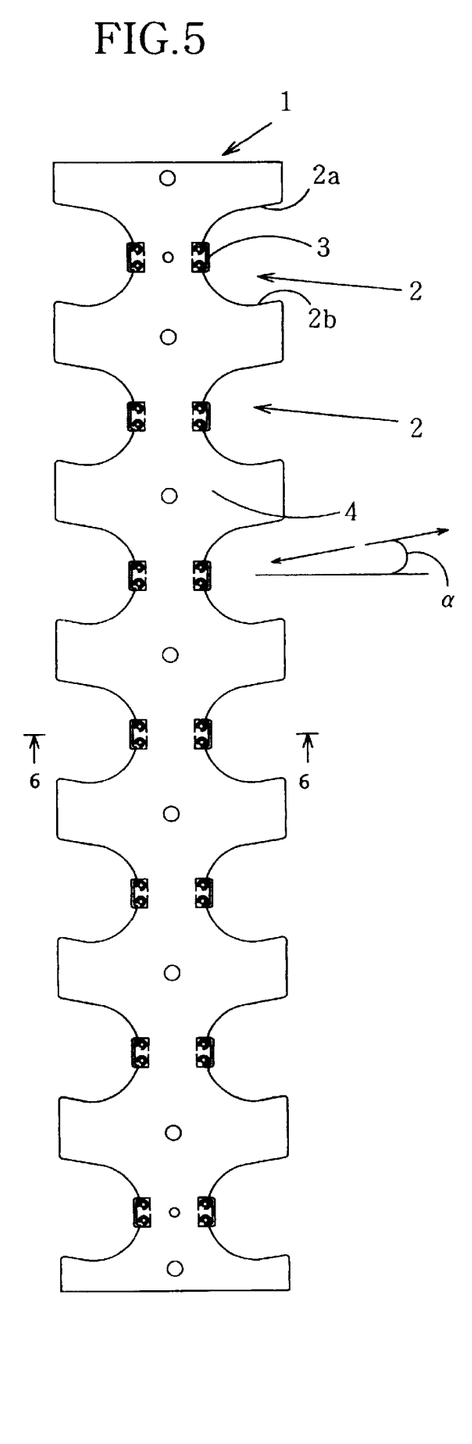
FIG. 5 is a front elevational view of a tool gripper according to a third embodiment of the invention.
Figure 6:
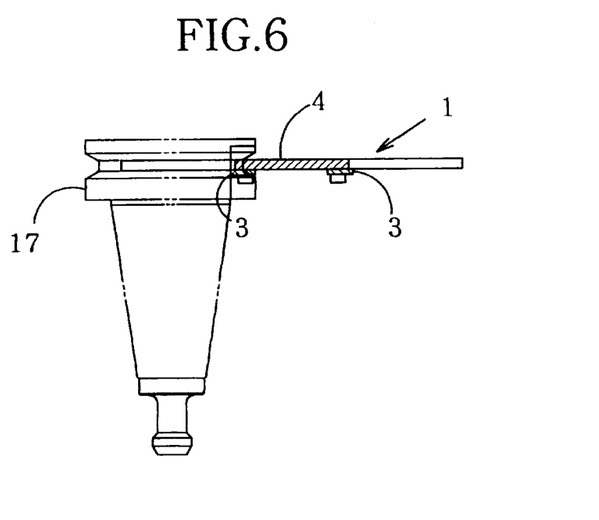
FIG. 6 is a cross-sectional view taken along the line 6—6 in FIG. 5.

FIGS. 5 and 6 show a tool gripper according to a third embodiment of the invention.

In this third embodiment, like the second embodiment shown in FIGS. 3 and 4, the tool gripper 1 is obtained by a vertically continuous elongated plate member 4; and the arm portion 2 is opened, like the first embodiment, obliquely upward so that the tool entrance 2a is positioned over the tool holding portion 2b at an obliquely upward location. With this structure, a tool can be taken out obliquely upward. Also in this embodiment, the plate member 4 is obtained by a laser working machine. Each one of the arm portions 2 is equipped at its tool holding portion 2b with a tool turn-preventive key 3. Since the structure of this embodiment includes the arm portion 2 opened obliquely upward, the tool can stay in the arm portion 2 by its own weight, and fall-preventive mechanisms such as the ball plunger, the leaf spring or the like are not required.

Figure 7:
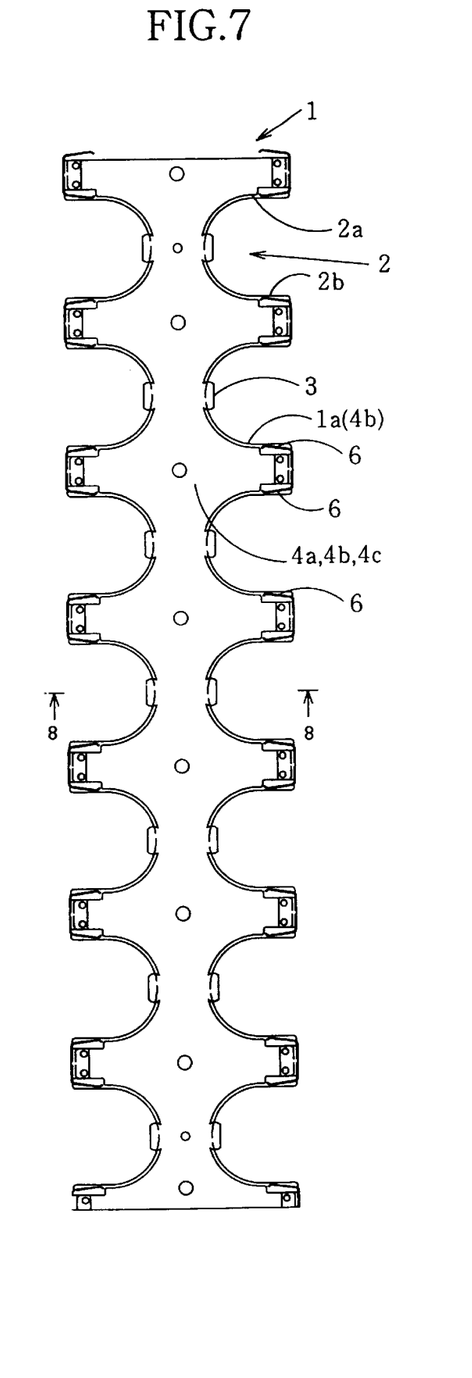
FIG. 7 is a front elevational view of a tool gripper according to a fourth embodiment of the invention.
Figure 8:
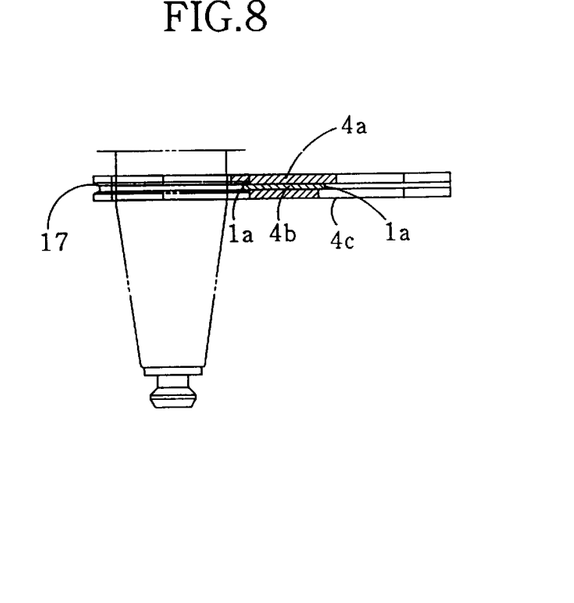
FIG. 8 is a cross-sectional view taken along the line 7—7 in FIG. 7.

FIGS. 7 and 8 show a tool gripper according to the fourth embodiment of the invention. In this embodiment, as best seen from FIG. 8, the tool gripper 1 is formed by overlaying three sheets of thin plates 4a, 4b and 4c in the thickness direction, thus obtaining a vertically continuous elongated plate 4 as shown in FIG. 7. As seen in FIG. 8, the thin plate 4a located in the most front side has a projected portion so that it functions as a tool turn-preventive key 3. In addition, the curved edge of the intermediate thin plate 4b sandwiched by other two thin plates 4a and 4c is formed with a smaller diameter compared to the curved edges of other thin plates 4a and 4c so that a V-groove contact ridge portion 1a that contacts the V-groove of the tool holder portion 17 of a tool is obtained by the curved edge of this intermediate thin plate 4b. The thin plates 4a and 4c in the front and back are cut by laser so that they have substantially an equal radii except the projected portions on which the tool turn-preventive key 3 are mounted.

With this overlaying structure that is comprised of the plurality of thin plates 4a, 4b and 4c, the ridge or the V-groove contact ridge portion 1a can be formed without a particular cutting work required therefor.

In this fourth embodiment, leaf springs 6 are provided on the upper and lower portions of the arm portion 2 so as to prevent the tools from falling.

Figure 9:
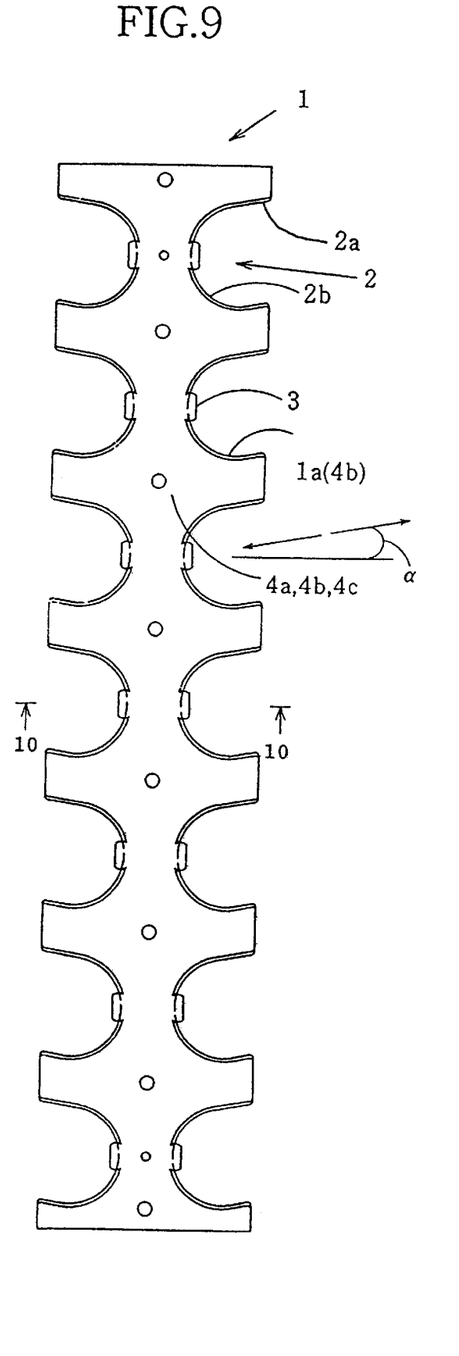
FIG. 9 is a front elevational view of a tool gripper according to a fifth embodiment of the invention.
Figure 10:
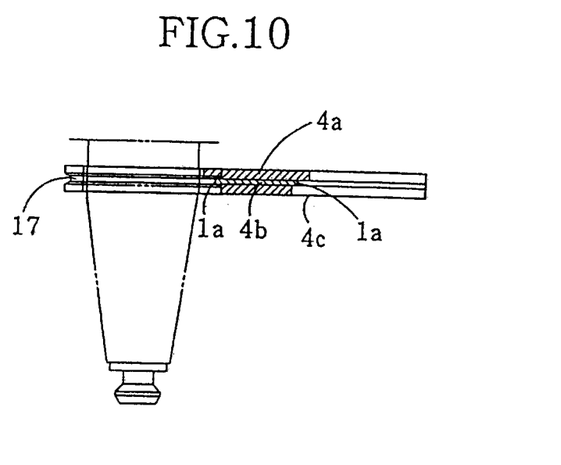
FIG. 10 is a cross-sectional view taken along the line 10—10 in FIG. 9.

FIGS. 9 and 10 show a tool gripper according to the fifth embodiment of the invention.

This embodiment is identical to the fourth embodiment in that the tool gripper 1 is formed by overlaying three sheets of thin plates 4a, 4b and 4c in the thickness direction. However, unlike the fourth embodiment, each of the arm portions 2 of this fifth embodiment is opened obliquely upward so that the tool entrance 2a is positioned over a tool holding portion 2b and the entrance 2a is located obliquely above the tool holding portion 2b as in the first and third embodiments. Thus, the tool is taken out obliquely upward. In this fifth embodiment as well, working on the thin plates can be done by laser; and the tool turn-preventive key 3 is provided on the tool holding portion 2b of the arm portion 2. In addition, with the structure that has the arm portion 2 opened obliquely upward, the tool can be held by its own weight; therefore, only the tool turn-preventive key 3 is required, and the fall-preventive means such as the ball plunger, the leaf spring or the like are not necessary. Thus, this fifth embodiment is the most preferable in that all the components of other embodiments are adapted therein.

Figure 13:
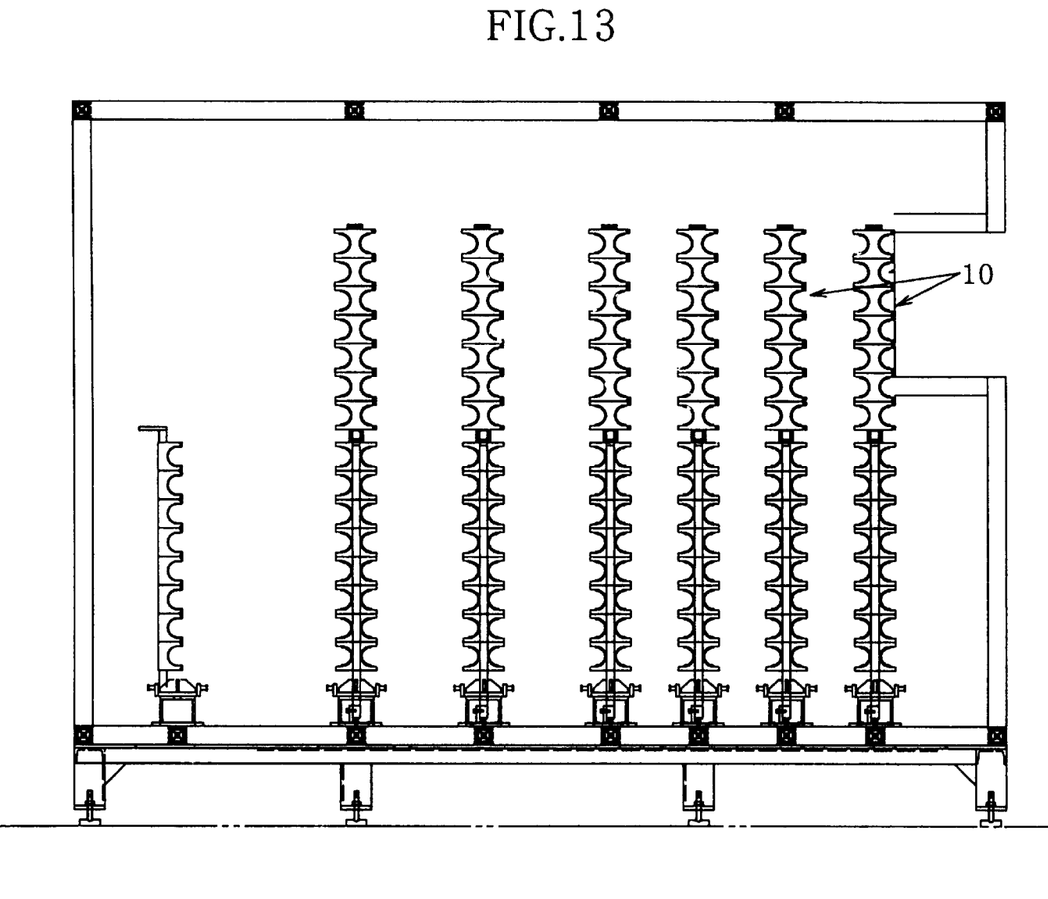
FIG. 13 is a diagram showing an arrangement of tool grippers.

As described before, in the tool gripper of the tool rack type magazine of the prior art, ball plungers 14 are provided in the upper and lower portions of each arm portion as shown in FIGS. 11 and 12, or the leaf springs 6 and the like as shown in FIG. 7 are employed. Moreover, each of the plate members is a small piece of gripper unit plate that has a pair of right and left arm portions, and it requires a number of assembling steps so as to match the number of tools to be accommodated. However, in the structure of the present invention in which the tools are taken out obliquely upward, those small unit plates are not required, and the number of assembling steps can be reduced. In addition, since a great number of tool grippers 10 are generally accommodated in the tool rack type magazine as shown in FIG. 13, the easiness of the working accomplished in the present invention is remarkably advantaged.

Furthermore, in the gripper of the tool rack type magazine of the prior art, the ridges that come into contact with the tool holding portion of a tool is obtained by a cutting operation that takes a great number of complicated working steps and requires the skills of the workers. It is also difficult to keep the working accuracy at a high level. To the contrary, according to the present invention, the cost can be drastically lowered since the invention adopts a laser work or a press work for obtaining the vertically continuous elongated plate members. Further, in the sandwich structure of the present invention that is obtained by fitting a plurality of thin plates together, the working for forming the contact ridge portion can be performed only by a press work without requiring any complicated cutting work by a machine tool.

As seen from the above, according to the invention, it is possible to facilitate the manufacture of tool rack type magazines and lower the manufacturing costs. As a result, though the tool rack type magazine automatic tool exchanging device has been said to be unsuitable for a small number of tools, a small scale tool rack type magazine can be obtained by the present invention which is used for a small number of tools with lower manufacturing costs.

What is claimed is:

1. A tool gripper which holds a plurality of tools in arm portions thereof and is provided in a tool rack type magazine that accommodates said tools used in machine tools, wherein each of said arm portions of said tool gripper is arc-shaped and opened in an obliquely upward direction so that a tool entrance of each of said arm portions is positioned obliquely upward over a tool holding portion of each of said arm portions, said arm portions are formed in a vertically continuous elongated plate member, and said elongated plate member is comprised of sheets of thin plates overlaid in a thickness direction, and said arm portion formed in one of said thin plates which is located at a center of said overlaid thin plates is made smaller in diameter than arm portions of other thin plates so as to form a ridge portion that engages a V-groove of a tool holder of said tool.

2. A tool gripper which holds a plurality of tools in arm portions thereof and is provided in a tool rack type magazine that accommodates said tools used in machine tools, wherein said arm portions are formed in a vertically continuous elongated plate and arc-shaped so as to open in an obliquely upward direction with a tool entrance of each of said arm portions positioned obliquely upward over a tool holding portion of said arm portions, said elongated plate is comprised of sheets of thin plates overlaid in a thickness direction, and said arm portion formed in one of said thin plates which is located at a center of said overlaid thin plates is made smaller in diameter than arm portions of other thin plates so as to form a ridge portion that engages a V-groove of a tool holder of said tool.

3. A tool gripper which holds a plurality of tools in arm portions thereof and is provided in a tool rack type magazine that accommodates said tools used in machine tools, wherein said arm portions are formed in a vertically continuous elongated plate and are arc-shaped, said elongated plate is comprised of sheets of thin plates overlaid in a thickness direction, and said arm portion formed in one of said thin plates which is located at a center of said overlaid thin plates is made smaller in diameter than arm portions of other thin plates so as to form a ridge portion that engages a V-groove of a tool holder of said tool.

* * * * *